(12) United States Patent
Snyder et al.

(10) Patent No.: US 10,113,434 B2
(45) Date of Patent: Oct. 30, 2018

(54) TURBINE BLADE DAMPER SEAL

(75) Inventors: Daniel A. Snyder, Manchester, CT (US); Kyle Charles Lana, Kensington, CT (US); Jonathan Perry Sandoval, East Hartford, CT (US); Scott Daniel Virkler, Ellington, CT (US); Jaimie Taraskevich, Tolland, CT (US); Edwin Otero, Southington, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 1921 days.

(21) Appl. No.: 13/362,552

(22) Filed: Jan. 31, 2012

(65) Prior Publication Data
US 2013/0195665 A1 Aug. 1, 2013

(51) Int. Cl.
| F01D 5/14 | (2006.01) |
| F01D 5/22 | (2006.01) |
| F01D 5/30 | (2006.01) |
| F01D 11/00 | (2006.01) |

(52) U.S. Cl.
CPC ............. *F01D 5/22* (2013.01); *F01D 5/3007* (2013.01); *F01D 11/006* (2013.01); *Y02T 50/673* (2013.01)

(58) Field of Classification Search
CPC ..... F01D 5/00; F01D 5/10; F01D 5/22; F01D 5/26; F01D 5/3007; F01D 11/006
See application file for complete search history.

(56) References Cited

U.S. PATENT DOCUMENTS

| 3,287,906 A | 11/1966 | McCormick |
| 3,754,484 A | 8/1973 | Roberts |
| 3,892,358 A | 7/1975 | Gisslen |
| 4,130,872 A | 12/1978 | Harloff |
| 4,285,633 A | 8/1981 | Jones |

(Continued)

FOREIGN PATENT DOCUMENTS

| EP | 0816638 A2 | 1/1998 |
| EP | 1522677 A2 | 4/2005 |

(Continued)

OTHER PUBLICATIONS

International Preliminary Report of Patentability for PCT Application No. PCT/US2013/023132 dated Aug. 14, 2014.

(Continued)

*Primary Examiner* — Woody Lee, Jr.
*Assistant Examiner* — Maxime Adjagbe
(74) *Attorney, Agent, or Firm* — Carlson, Gaskey & Olds, P.C.

(57) ABSTRACT

A damper seal received in a cavity of a turbine blade located between a platform and a retention shelf damper seal according to an exemplary aspect of the present disclosure includes, among other things, a central body portion having a first end region, an opposing second end region, and a width. The damper seal further includes a first portion extending from the first end region of the central body portion, and a first end region of the first portion includes first outwardly extending tabs that define a first enlarged portion that has a first width greater than the width of the central body portion and a second portion extending from the opposing second end region of the central body portion.

19 Claims, 15 Drawing Sheets

(56) References Cited

U.S. PATENT DOCUMENTS

| | | | |
|---|---|---|---|
| 4,455,122 | A | 6/1984 | Schwarzmann et al. |
| 4,743,164 | A | 5/1988 | Kalogeros |
| 4,872,810 | A | 10/1989 | Brown et al. |
| 5,056,935 | A | 10/1991 | Singh |
| 5,226,784 | A | 7/1993 | Mueller et al. |
| 5,228,835 | A | 7/1993 | Chlus |
| 5,251,985 | A | 10/1993 | Monzel |
| 5,313,786 | A | 5/1994 | Chlus et al. |
| 5,316,391 | A | 5/1994 | Monzel |
| 5,344,239 | A | 9/1994 | Stallone et al. |
| 5,415,526 | A | 5/1995 | Mercadante et al. |
| 5,433,674 | A | 7/1995 | Sheridan et al. |
| 5,447,411 | A | 9/1995 | Curley et al. |
| 5,460,489 | A | 10/1995 | Benjamin et al. |
| 5,462,410 | A | 10/1995 | Smith et al. |
| 5,478,207 | A | 12/1995 | Stec |
| 5,513,955 | A | 5/1996 | Barcza |
| 5,524,847 | A | 6/1996 | Brodell et al. |
| 5,573,375 | A | 11/1996 | Barcza |
| 5,735,671 | A | 4/1998 | Brauer et al. |
| 5,778,659 | A | 7/1998 | Duesler et al. |
| 5,785,499 | A | 7/1998 | Houston et al. |
| 5,803,710 | A | 9/1998 | Dietrich et al. |
| 5,827,047 | A | 10/1998 | Gonsor et al. |
| 5,857,836 | A | 1/1999 | Stickler et al. |
| 5,915,917 | A | 6/1999 | Eveker et al. |
| 5,924,699 | A | 7/1999 | Airey et al. |
| 5,975,841 | A | 11/1999 | Lindemuth et al. |
| 6,223,616 | B1 | 5/2001 | Sheridan |
| 6,314,717 | B1 | 11/2001 | Teets et al. |
| 6,318,070 | B1 | 11/2001 | Rey et al. |
| 6,354,803 | B1 | 12/2002 | Grover |
| 6,565,322 | B1 | 5/2003 | Lieser et al. |
| 6,814,541 | B2 | 11/2004 | Evans et al. |
| 6,932,575 | B2 * | 8/2005 | Surace .................. F01D 5/22 416/193 A |
| 7,021,042 | B2 | 4/2006 | Law |
| 7,121,800 | B2 | 10/2006 | Beattie |
| 7,322,797 | B2 | 1/2008 | Lee et al. |
| 7,467,924 | B2 | 12/2008 | Charbonneau et al. |
| 7,503,748 | B2 | 3/2009 | Ferra et al. |
| 7,591,754 | B2 | 9/2009 | Duong et al. |
| 7,694,505 | B2 | 4/2010 | Schilling |
| 7,731,482 | B2 | 6/2010 | Lagrange et al. |
| 7,824,305 | B2 | 11/2010 | Duong et al. |
| 7,926,260 | B2 | 4/2011 | Sheridan et al. |
| 8,011,892 | B2 | 9/2011 | Ramlogan et al. |
| 8,205,432 | B2 | 6/2012 | Sheridan |
| 2005/0175462 | A1 | 8/2005 | Lagrange et al. |
| 2009/0004013 | A1* | 1/2009 | Ramlogan .............. F01D 5/22 416/190 |
| 2009/0175732 | A1 | 7/2009 | Glasspoole et al. |
| 2010/0148396 | A1 | 6/2010 | Xie et al. |
| 2010/0331139 | A1 | 12/2010 | McCune |

FOREIGN PATENT DOCUMENTS

| | | |
|---|---|---|
| EP | 1635037 A2 | 3/2006 |
| EP | 2366872 | 9/2011 |
| GB | 1259750 A | 1/1972 |
| GB | 1516041 | 6/1978 |
| GB | 2041090 | 9/1980 |
| WO | 2007038674 | 4/2007 |
| WO | 2010/103551 A1 | 9/2010 |

OTHER PUBLICATIONS

International Search Report and Written Opinion for International Application No. PCT/US2013/023132 completed on Sep. 12, 2013.
Gunston, Bill, "Jane's Aero-Engines," Issue Seven, 2000, pp. 510-512.
Supplementary Partial European Search Report for EP Application No. 13775907.2 dated Feb. 15, 2016.
Kurzke, J. (2009). Fundamental differences between conventional and geared turbofans. Proceedings of ASME Turbo Expo: Power for Land, Sea, and Air. 2009, Orlando, Florida.
Agarwal, B.D and Broutman, L.J. (1990). Analysis and performance of fiber composites, 2nd Edition. John Wiley & Sons, Inc. New York: New York.
Carney, K., Pereira, M. Revilock, and Matheny, P. Jet engine fan blade containment using two alternate geometries. 4th European LS-DYNA Users Conference.
Brines, G.L. (1990). The turbofan of tomorrow. Mechanical Engineering: The Journal of the American Society of Mechanical Engineers, 108(8), 65-67.
Faghri, A. (1995). Heat pipe and science technology. Washington, D.C.: Taylor & Francis.
Hess, C. (1998). Pratt & Whitney develops geared turbofan. Flug Revue 43(7). Oct. 1998.
Grady, J.E., Weir, D.S., Lamoureux, M.G., and Martinez, M.M. (2007). Engine noise research in NASA's quiet aircraft technology project. Papers from the International Symposium on Air Breathing Engines (ISABE). 2007.
Griffiths, B. (2005). Composite fan blade containment case. Modern Machine Shop. Retrieved from: http://www.mmsonline.com/articles/composite-fan-blade-containment-case.
Hall, C.A. and Crichton, D. (2007). Engine design studies for a silent aircraft. Journal of Turbomachinery, 129, 479-487.
Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37(20), 1821-1837.
Brennan, P.J. and Kroliczek, E.J. (1979). Heat pipe design handbook. Prepared for National Aeronautics and Space Administration by B & K Engineering, Inc. Jun. 1979.
Horikoshi, S. and Serpone, N. (2013). Introduction to nanoparticles. Microwaves in nanoparticle synthesis. Wiley-VCH Verlag GmbH & Co. KGaA.
Kerrebrock, J.L. (1977). Aircraft engines and gas turbines. Cambridge, MA: The MIT Press.
Xie, M. (2008). Intelligent engine systems: Smart case system. NASA/CR-2008-215233.
Knip, Jr., G. (1987). Analysis of an advanced technology subsonic turbofan incorporating revolutionary materials. NASA Technical Memorandum. May 1987.
Willis, W.S. (1979). Quiet clean short-haul experimental engine (QCSEE) final report. NASA/CR-159473.
Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.
Kollar, L.P. and Springer, G.S. (2003). Mechanics of composite structures. Cambridge, UK: Cambridge University Press.
Ramsden, J.M. (Ed). (1978). The new European airliner. Flight International, 113(3590). Jan. 7, 1978.
Langston, L. and Faghri, A. Heat pipe turbine vane cooling. Prepared for Advanced Turbine Systems Annual Program Review. Morgantown, West Virginia. Oct. 17-19, 1995.
Oates, G.C. (Ed). (1989). Aircraft propulsion systems and technology and design. Washington, D.C.: American Institute of Aeronautics, Inc.
Lau, K., Gu, C., and Hui, D. (2005). A critical review on nanotube and nanotube/nanoclay related polymer composite materials. Composites: Part B 37(2006) 425-436.
Shorter Oxford English dictionary, 6th Edition. (2007). vol. 2, N-Z. p. 1888.
Lynwander, P. (1983). Gear drive systems: Design and application. New York, New York: Marcel Dekker, Inc.
Sweetman, B. and Sutton, O. (1998). Pratt & Whitney's surprise leap. Interavia Business & Technology, 53.621, p. 25.
Mattingly, J.D. (1996). Elements of gas turbine propulsion. New York, New York: McGraw-Hill, Inc.
Pyrograf-III Carbon Nanofiber. Product guide. Retrieved from: http://pyrografproducts.com/Merchant5/merchant.mvc?Screen=cp_nanofiber.

(56) References Cited

OTHER PUBLICATIONS

Nanocor Technical Data for Epoxy Nanocomposites using Nanomer 1.30E Nanoclay. Nnacor, Inc.

Ratna, D. (2009). Handbook of thermoset resins. Shawbury, UK: iSmithers.

Wendus, B.E., Stark, D.F., Holler, R.P., and Funkhouser, M.E. (2003). Follow-on technology requirement study for advanced subsonic transport. NASA/CR-2003-212467.

Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.

Merriam-Webster's collegiate dictionary, 11th Ed. (2009). p. 824.

Merriam-Webster's collegiate dictionary, 10th Ed. (2001). p. 1125-1126.

Whitaker, R. (1982). ALF 502: plugging the turbofan gap. Flight International, p. 237-241, Jan. 30, 1982.

Hughes, C. (2010). Geared turbofan technology. NASA Environmentally Responsible Aviation Project. Green Aviation Summit. NASA Ames Research Center. Sep. 8-9, 2010.

File History for U.S. Appl. No. 12/131,876.

Cusick, M. (1981). Avco Lycoming's ALF 502 high bypass fan engine. Society of Automotive Engineers, inc. Business Aircraft Meeting & Exposition. Wichita, Kansas. Apr. 7-10, 1981.

Fledderjohn, K.R. (1983). The TFE731-5: Evolution of a decade of business jet service. SAE Technical Paper Series. Business Aircraft Meeting & Exposition. Wichita, Kansas. Apr. 12-15, 1983.

Dickey, T.A. and Dobak, E.R. (1972). The evolution and development status of ALF 502 turbofan engine. National Aerospace Engineering and Manufacturing Meeting. San Diego, California. Oct. 2-5, 1972.

Gunston, B. (Ed.) (2000). Jane's aero-engines, Issue seven. Coulsdon, Surrey, UK: Jane's Information Group Limited.

Ivchenko-Progress D-436. Jane's Aero-engines, Aero-engines—Turbofan. Feb. 8, 2012.

Ivchenko-Progress AI-727M. Jane's Aero-engines, Aero-engines—Turbofan. Nov. 27, 2011.

Ivchenko-Progress D-727. Jane's Aero-engines, Aero-engines—Turbofan. Feb. 7, 2007.

Turbomeca Aubisque. Jane's Aero-engines, Aero-engines—Turbofan. Nov. 2, 2009.

Aviadvigatel D-110. Jane's Aero-engines, Aero-engines—Turbofan. Jun. 1, 2010.

Rolls-Royce M45H. Jane's Aero-engines, Aero-engines—Turbofan. Feb. 24, 2010.

Honeywell LF502. Jane's Aero-engines, Aero-engines—Turbofan. Feb. 9, 2012.

Honeywell LF507. Jane's Aero-engines, Aero-engines—Turbofan. Feb. 9, 2012.

Honeywell TFE731. Jane's Aero-engines, Aero-engines—Turbofan. Jul. 18, 2012.

NASA Conference Publication. Quiet, powered-lift propulsion. Cleveland, Ohio. Nov. 14-15, 1978.

"Civil Turbojet/Turbofan Specifications", Jet Engine Specification Database (Apr. 3, 2005).

Kandebo, S.W. (1993). Geared-turbofan engine design targets cost, complexity. Aviation Week & Space Technology, 148(8), p. 32.

Hendricks, E.S. and Tong, M.T. (2012). Performance and weight estimates for an advanced open rotor engine. NASA/TM-2012-217710.

Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883.

Zalud, T. (1998). Gears put a new spin on turbofan performance. Machine Design, 70(20), p. 104.

Conference on Engineering and Physics: Synergy for Success 2006. Journal of Physics: Conference Series vol. 105. London, UK. Oct. 5, 2006.

Extended European Search Report for EP Application No. 13775907.2 dated May 2, 2016.

\* cited by examiner

TURBINE BLADE DAMPER SEAL

BACKGROUND OF THE INVENTION

A gas turbine engine includes a plurality of turbine blades each received in a slot of a turbine disk. The turbine blades are exposed to aerodynamic forces that can result in vibratory stresses. A damper can be located under platforms of adjacent turbine blades to reduce the vibratory response and provide frictional damping between the turbine blades. The damper slides on an underside of the platforms. The damper is made of a material that is dissimilar from the material of the turbine blades. When the vibratory motions of adjacent turbine blades oppose each other (that is, occur out of phase), the damper slides to absorb the energy of vibration. It is usually a stiff slug of metal with rigid features to provide consistent contact with each side of the platform.

Additionally, the turbine blades are exposed to hot gasses. An air cavity between a turbine disk and a gas path of a turbine blade may be pressurized with cooling air to protect the turbine disk from high temperatures. A separate seal is often located near the platform to control the leakage of the cooling air into the hot gasses, improving engine performance and fuel efficiency.

SUMMARY OF THE INVENTION

A damper seal is received in a cavity of a turbine blade located between a platform and a retention shelf, the damper seal according to an exemplary aspect of the present disclosure includes, among other things, a central body portion having a first end region, an opposing second end region, and a width. The damper seal further includes a first portion extending from the first end region of the central body portion, and a first end region of the first portion includes first outwardly extending tabs that define a first enlarged portion that has a first width greater than the width of the central body portion and a second portion extending from the opposing second end region of the central body portion.

In a further non-limited embodiment of any of the foregoing damper seal embodiments, the damper seal may include a second end region of a second portion that includes second outwardly extending tabs that define a second enlarged portion that has a second width greater than the width of the central body portion.

In a further non-limited embodiment of any of the foregoing damper seal embodiments, the damper seal may be formed from stamped sheet metal.

In a further non-limited embodiment of any of the foregoing damper seal embodiments, the damper seal may include a first enlarged portion that rests on a retention shelf of a turbine blade.

In a further non-limited embodiment of any of the foregoing damper seal embodiments, the damper seal may include a first portion that includes another tab that extends substantially perpendicularly to first outwardly extending tabs.

In a further non-limited embodiment of any of the foregoing damper seal embodiments, the damper seal may include a second portion that includes another tab that extends substantially perpendicularly to second outwardly extending tabs.

In a further non-limited embodiment of any of the foregoing damper seal embodiments, the damper seal may include a portion that engages a groove in a turbine disk lug of a turbine disk.

In a further non-limited embodiment of any of the foregoing damper seal embodiments, the damper seal may include a central body including a projection that defines an opening, and the opening receives a lug of a turbine blade to align the damper seal relative to the turbine blade.

A turbine blade according to an exemplary aspect of the present disclosure includes, among other things, a root received in a slot of a turbine disk, a blade, and a platform located between the root and the blade. The platform includes a retention shelf, and a cavity is defined between a lower surface of the platform and the retention shelf. The turbine blade includes a damper seal received in the cavity of the turbine blade. The damper seal includes a central body portion having a first end region, an opposing second end region, a width, a first portion extending generally downward from the first end region of the central body portion, and a second portion extending generally downward from the opposing second end region of the central body portion. A first end region of the first portion includes first outwardly extending tabs that define a first enlarged portion that has a first width greater than the width of the central body portion.

In a further non-limited embodiment of any of the foregoing turbine blade embodiments, the turbine blade may include a second end region of a second portion that includes second outwardly extending tabs that define a second enlarged portion that has a second width greater than the width of the central body portion.

In a further non-limited embodiment of any of the foregoing turbine blade embodiments, the turbine blade may be formed from stamped sheet metal.

In a further non-limited embodiment of any of the foregoing turbine blade embodiments, the turbine blade may include a first enlarged portion that rests on a retention shelf of a turbine blade.

In a further non-limited embodiment of any of the foregoing turbine blade embodiments, the turbine blade may include a first portion that includes another tab that extends substantially perpendicularly to first outwardly extending tabs.

In a further non-limited embodiment of any of the foregoing turbine blade embodiments, the turbine blade may include a second portion that includes another tab that extends substantially perpendicularly to second outwardly extending tabs.

In a further non-limited embodiment of any of the foregoing turbine blade embodiments, the turbine blade may include a portion that engages a groove in a turbine disk lug of a turbine disk.

In a further non-limited embodiment of any of the foregoing turbine blade embodiments, the turbine blade may include a central body including a projection that defines an opening, and the opening receives a lug of a turbine blade to align the damper seal relative to the turbine blade.

A turbine according to an exemplary aspect of the present disclosure includes, among other things, a turbine disk including a plurality of lugs and a plurality of slots, where each of the plurality of lugs is located between two of the plurality of slots, and each of the plurality of lugs includes a tab that extends upwardly. The tab has first section having an upper surface and a second section having an upper surface, the upper section of the first section is inclined greater than the upper surface of the second section, and the upper surface of the first section of the tab defines a contour. The turbine includes a turbine blade, where the turbine blade includes a root received in one of the plurality of slots and a platform, and the platform has a lower surface defining a contour. When the turbine blade is received in one of the plurality of slots, the lower surface of the platform is located above a portion of the upper surface of the first section of the tab, and the contour of the upper surface of the first section of the tab matches the contour of the lower surface of the platform.

In a further non-limited embodiment of any of the foregoing turbine embodiments, the turbine may include an upper surface of each of the plurality of lugs that includes an axial groove and a circumferential groove that intersects the axial groove, and the circumferential groove defines a rear surface of the tab.

In a further non-limited embodiment of any of the foregoing turbine embodiments, the turbine may include a circumferential groove that is deeper than an axial groove.

In a further non-limited embodiment of any of the foregoing turbine embodiments, the turbine may include an axial groove that receives a damper seal located under a platform.

In a further non-limited embodiment of any of the foregoing turbine embodiments, the turbine may include a portion of a damper seal that rests against a rear surface of a tab.

In a further non-limited embodiment of any of the foregoing turbine embodiments, the turbine may include an upper surface of a first section of a tab that is substantially parallel to the lower surface of the platform.

These and other features of the present invention can be best understood from the following specification and drawings, the following of which is a brief description.

DETAILED DESCRIPTION OF THE PREFERRED EMBODIMENTS

Figure 1:
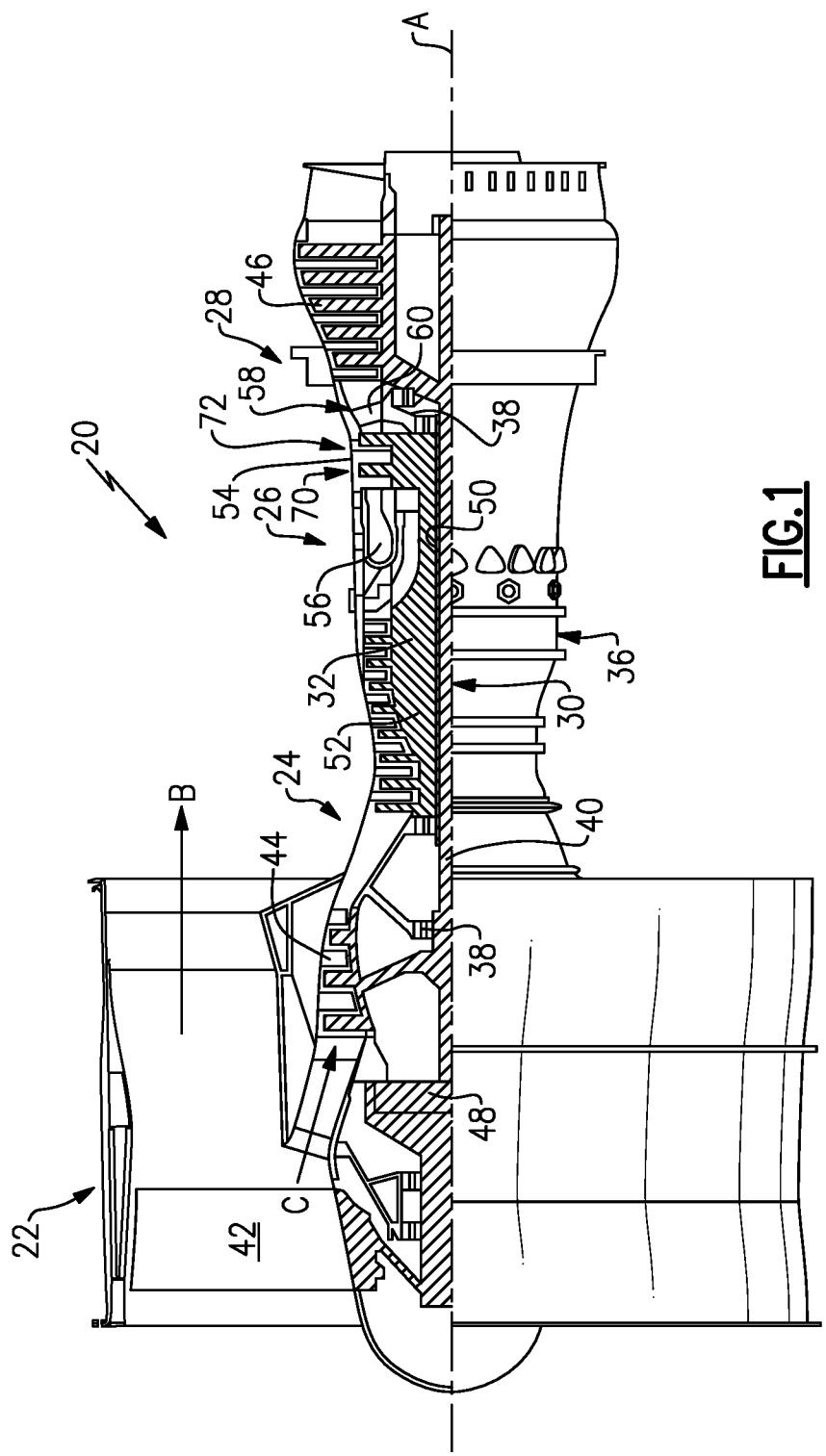
FIG. 1 illustrates a schematic view of an embodiment of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features.

Although depicted as a turbofan gas turbine engine in the disclosed non-limiting embodiment, it should be understood that the concepts described herein are not limited to use with turbofans as the teachings may be applied to other types of turbine engines including three-spool or geared turbofan architectures.

The fan section 22 drives air along a bypass flowpath B while the compressor section 24 drives air along a core flowpath C for compression and communication into the combustor section 26 then expansion through the turbine section 28.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure compressor 44 and a low pressure turbine 46. The inner shaft 40 is connected to the fan 42 through a geared architecture 48 to drive the fan 42 at a lower speed than the low speed spool 30. The high speed spool 32 includes an outer shaft 50 that interconnects a high pressure compressor 52 and a high pressure turbine 54.

Figure 2:
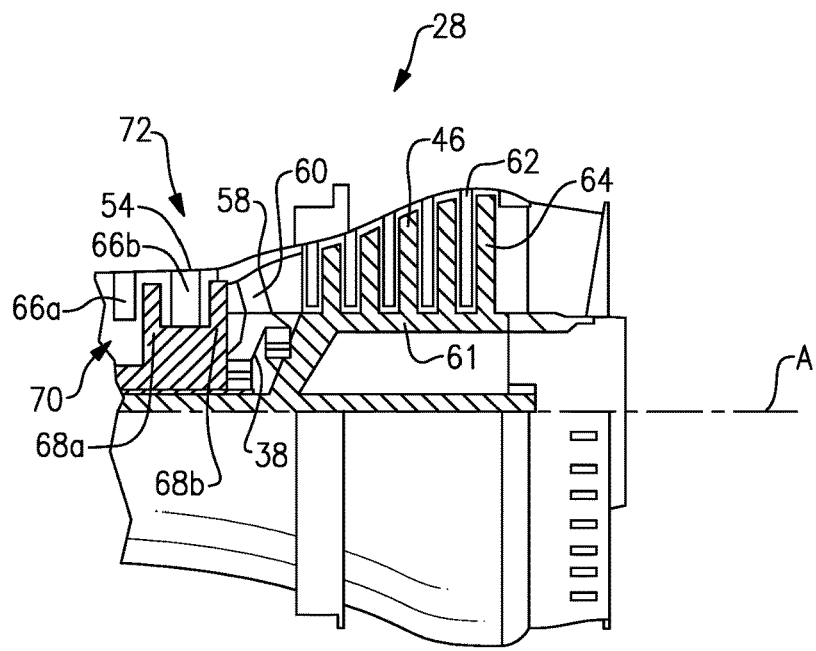
FIG. 2 illustrates a turbine section of FIG. 1.

As shown in FIG. 2, the high pressure turbine 54 includes a first stage 70 and a second stage 72. The first stage 70 includes a static vane 66a and plurality of turbine blades 68a. The second stage 72 includes a static vane 66b and a plurality of turbine blades 68b.

A combustor 56 is arranged between the high pressure compressor 52 and the high pressure turbine 54.

A mid-turbine frame 58 of the engine static structure 36 is arranged generally between the high pressure turbine 54 and the low pressure turbine 46. The mid-turbine frame 58 further supports bearing systems 38 in the turbine section 28.

The inner shaft 40 and the outer shaft 50 are concentric and rotate via bearing systems 38 about the engine central longitudinal axis A, which is collinear with their longitudinal axes.

The core airflow C is compressed by the low pressure compressor 44, then the high pressure compressor 52, mixed and burned with fuel in the combustor 56, then expanded over the high pressure turbine 54 and low pressure turbine 46. The mid-turbine frame 58 includes airfoils 60 which are in the core airflow path. The turbines 46, 54 rotationally drive the respective low speed spool 30 and high speed spool 32 in response to the expansion.

The engine 20 is in one example a high-bypass geared aircraft engine. In a further example, the engine 20 bypass ratio is greater than about six (6:1) with an example embodiment being greater than ten (10:1). The geared architecture 48 is an epicyclic gear train (such as a planetary gear system or other gear system) with a gear reduction ratio of greater than about 2.3 (2.3:1). The low pressure turbine 46 has a pressure ratio that is greater than about five (5:1). The low pressure turbine 46 pressure ratio is pressure measured prior to inlet of low pressure turbine 46 as related to the pressure at the outlet of the low pressure turbine 46 prior to an exhaust nozzle.

In one disclosed embodiment, the engine 20 bypass ratio is greater than about ten (10:1), and the fan diameter is significantly larger than that of the low pressure compressor 44. The low pressure turbine 46 has a pressure ratio that is greater than about five (5:1). The geared architecture 48 may be an epicycle gear train, such as a planetary gear system or other gear system, with a gear reduction ratio of greater than about 2.5 (2.5:1). It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition— typically cruise at about 0.8 Mach and about 35,000 feet. The flight condition of 0.8 Mach and 35,000 feet, with the engine at its best fuel consumption, also known as bucket cruise Thrust Specific Fuel Consumption ("TSFC"). TSFC is the industry standard parameter of lbm of fuel being burned divided by lbf of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.45.

"Low corrected fan tip speed" is the actual fan tip speed in feet per second divided by an industry standard temperature correction of $[(Tambient\ deg\ R)/518.7)^{0.5}]$. The "Low corrected fan tip speed" as disclosed herein according to one non-limiting embodiment is less than about 1150 feet per second (351 meters per second).

FIG. 2 illustrates the turbine section 28. The turbine section 28 includes turbine discs 61 that each rotate about the axis A. In the first stage 70 of the high pressure turbine 54, a plurality of turbine blades 68a are mounted on a turbine disk 61. In the second stage 72 of the high pressure turbine 54, a plurality of turbine blades 68b are mounted on another turbine disk 61.

Figure 3:
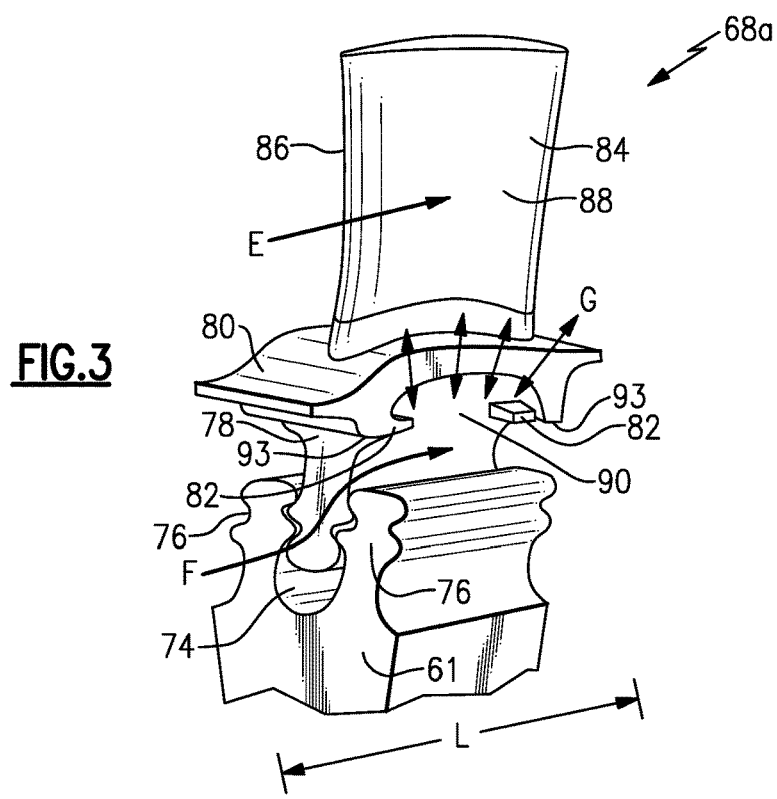
FIG. 3 illustrates an embodiment of a turbine blade and a turbine disk.

FIG. 3 illustrates a perspective view of a turbine blade 68a partially installed in a turbine disk 61. In one example, the turbine blades 68a are made of a nickel alloy. The turbine disk 61 includes a plurality of slots 74 separated by turbine disk lugs 76. The slot may be in the shape of a dovetail, a fir tree shaped or some other configuration. The turbine blade 68a includes a root 78 that is received in one of the plurality of turbine disk slots 74 of the turbine disk 61, a platform 80 including retention shelves 82 and buttresses 93, and an airfoil 84. The platform 80 has a length L. The airfoil 84 has a leading edge 86 and a trailing edge 88. A neck cavity 90 is defined between the platform 80 and the retention shelf 82. A buttress 93 is also located in the neck cavity 90 and under the platform 80 of each turbine blade 68a. The buttress 93 is a support structure that connects the platform 80 to the retention shelf 82.

Hot gasses flow along a hot gas flow path E. The neck cavity 90 between adjacent turbine blades 68a is pressurized with a flow of cooling air F to protect the turbine discs 61 from the hot gasses in the hot gas flow path E.

Figure 4A:
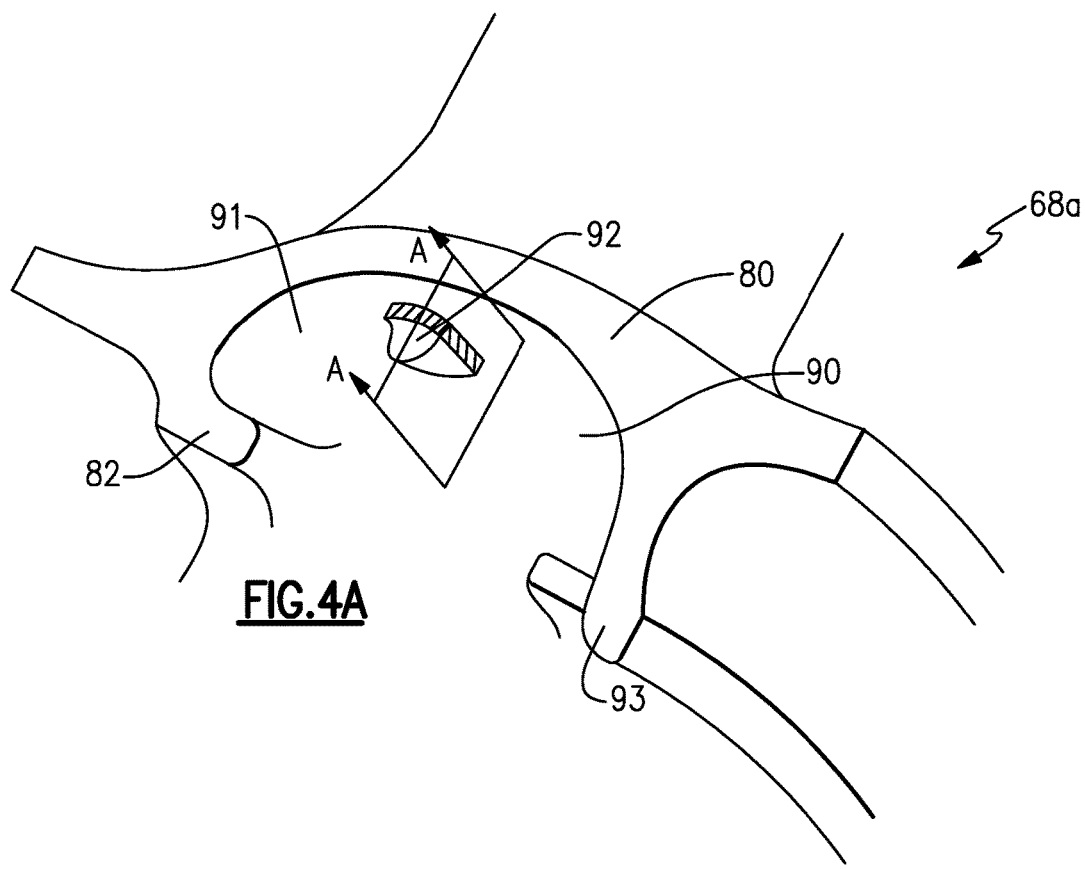
FIG. 4A illustrates a bottom perspective view of the turbine blade of FIG. 3.

FIG. 4A illustrates a lower perspective view of a turbine blade 68a to be located in the first stage 70 of the high pressure turbine 54, for example. The neck cavity 90 includes a retention nub 92 located on a lower surface 91 of the platform 80.

Figure 4B:
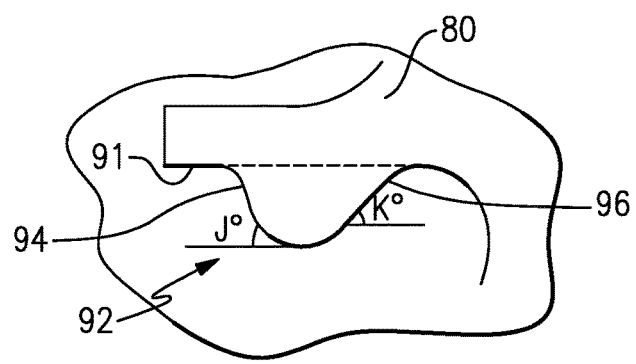
FIG. 4B illustrates a retention nub of the turbine blade the taken along section A-A of FIG. 4A.

FIG. 4B illustrates a cross-sectional view of the retention nub 92 taken along section A-A of FIG. 4A. The retention nub 92 includes a first surface 94 and a second surface 96. An angle J defined between the first surface 94 and a horizontal plane is approximately 30 to 60 degrees. An angle K defined between the second surface 96 and the horizontal plane is approximately 45 to 85 degrees.

Figure 5:
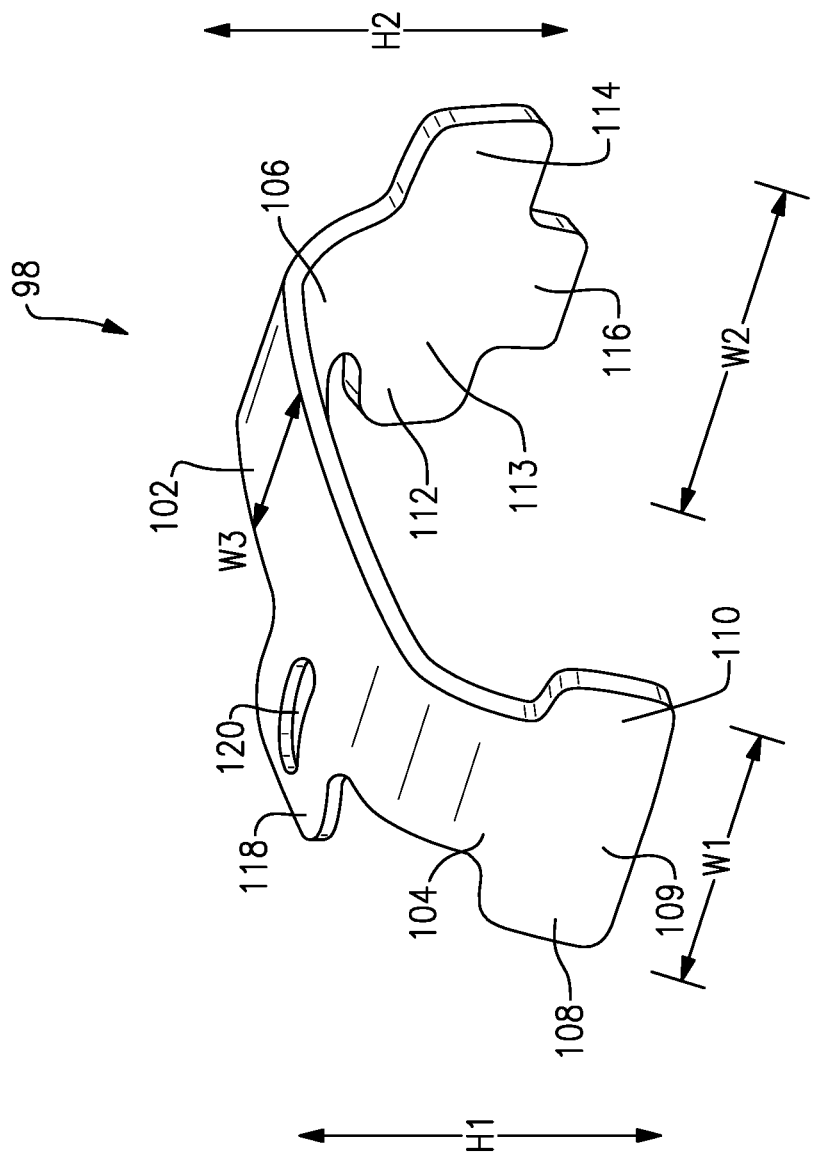
FIG. 5 illustrates an embodiment of a perspective view of a first example damper seal.
Figure 7:
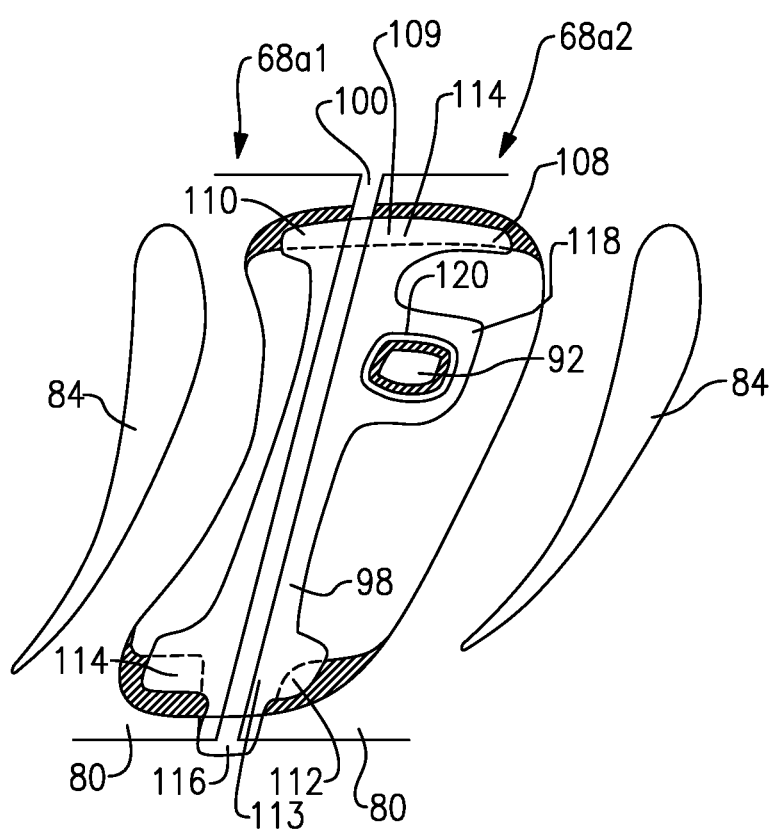
FIG. 7 illustrates a top cross-sectional view of the first example damper seal installed between two adjacent turbine blades.

FIG. 5 illustrates a perspective view of a damper seal 98 that spans a space 100 (as shown in FIG. 7) between platforms 80 of adjacent turbine blades 68a in the first stage 70 of the high pressure turbine 54 to provide both damping and sealing and prevent the leakage of the cooling air F. The damper seal 98 imposes a normal load on the adjacent turbine blades 68a due to centrifugal force. The resulting frictional force created by the normal load produces damping to reduce a vibratory response. The damper seal 98 prevents the cooling air F in the neck cavity 90 from leaking into the hot flow gas path E along arrows G (shown in FIG. 3).

The damper seal 98 is formed from stamped sheet metal. The damper seal 98 can also be formed by direct metal laser sintering. Other manufacturing methods are possible. The damper seal 98 is ductile enough to conform to the lower surface 91 of the platform 80 and provide consistent and complete contact with the turbine blade 68a. In one example, the damper seal 98 is substantially c-shaped. This embodiment of a damper seal 98 includes a slightly curved upper portion 102. A first downwardly curved portion 104 and a second downwardly curved portion 106 extend from opposing end regions of the slightly curved upper portion 102. In one example, relative to the slightly curved upper portion 102 of the damper seal 98, a height H2 of the second downwardly curved portion 106 is longer than a height H1 of the first downwardly curved portion 104.

An end region of the first downwardly curved portion 104 includes a first tab 108 and a second tab 110 that each extend in opposing directions and substantially perpendicularly to the first downwardly curved portion 104. Together, the tabs 108 and 110 define an enlarged section 109 having a width W1 that is greater than a width W3 of the first downwardly curved portion 104 and prevent rocking of the damper seal 98.

An end region of the second downwardly curved portion 106 includes a first tab 112 and a second tab 114 that each extend in opposing directions and substantially perpendicular to the second downwardly curved portion 106. Together, the tabs 112 and 114 define an enlarged section 113 having a width W2 that is greater than the width W3 of the second downwardly curved portion 106 and prevent rocking of the damper seal 98. A third tab 116 extends substantially perpendicularly to the tabs 112 and 114 and also extends in the same general direction as the second downwardly curved portion 106. The third tab 116 is narrower than the enlarged section 113. The third tab 116 provides sealing to the neck cavity 90 and prevents the passage of the cooling air F into the hot gas flow path E. The first downwardly curved portion 104 does not include a corresponding tab because sealing is not necessary in this location due to the flow path of the hot gas E in the first stage 70 of the high pressure turbine 54.

The damper seal 98 also includes another projection 118 that extends substantially perpendicularly to the slightly curved upper portion 102. The another projection 118 is located closer to the tabs 108 and 110 of the first downwardly curved portion 104 of the damper seal 98 than to the tabs 112, 114 and 116 of the second downwardly curved portion 106 of the damper seal 98. The another projection 118 includes an opening 120 that receives the retention nub 92 (shown in FIG. 6) of the turbine blade 68a when the damper seal 98 is installed, preventing misalignment between the damper seal 98 and the turbine blade 68a.

Figure 6:
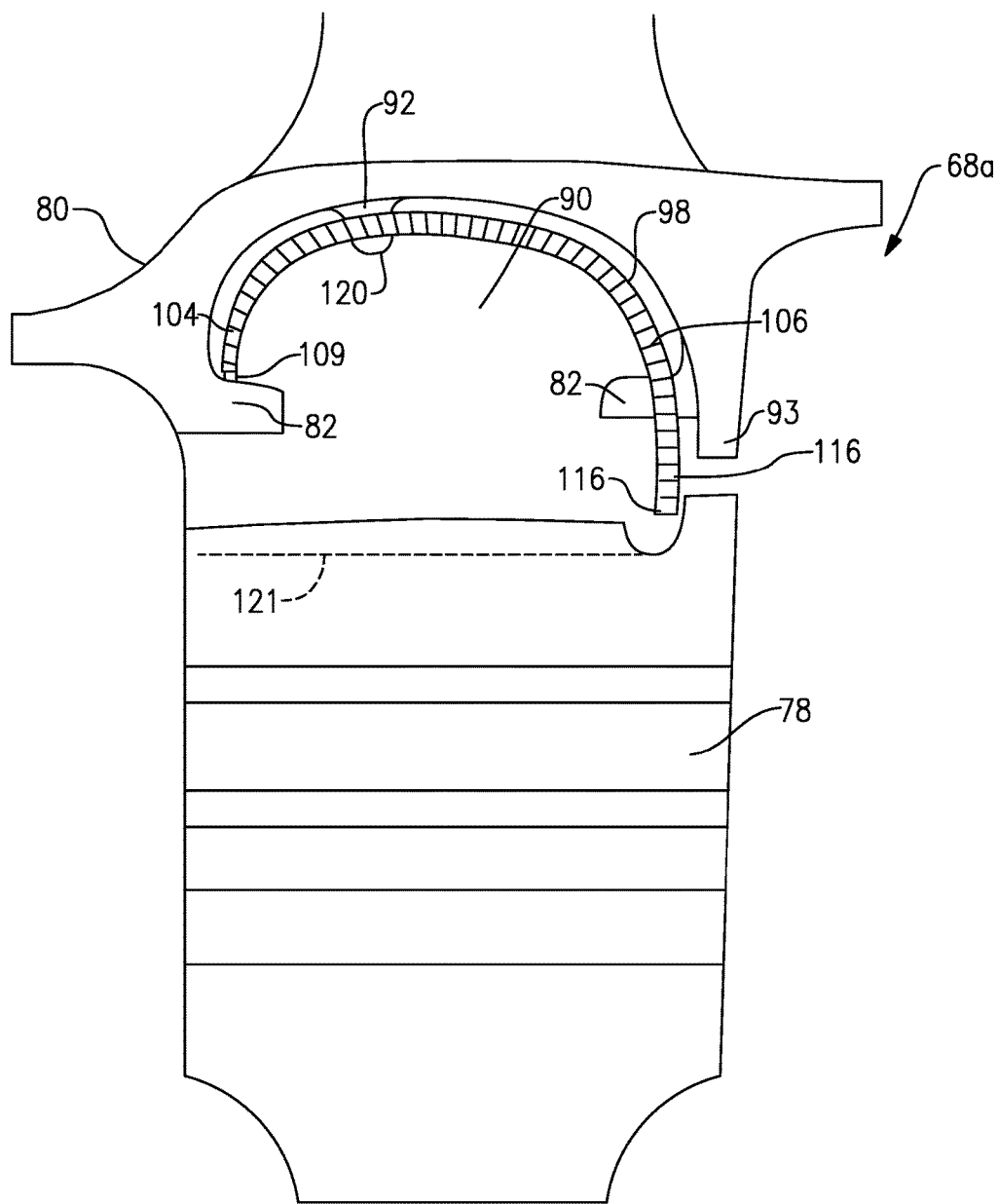
FIG. 6 illustrates a side view of a turbine blade with the first example damper seal installed.

FIG. 6 illustrates a side view of the turbine blade 68a with the damper seal 98 installed in the neck cavity 90. The retention nub 92 of the turbine blade 68a is received in the opening 120 of the another projection 118 of the damper seal 98. The enlarged section 109 of the first downwardly curved portion 104 rests on one of the retention shelves 82. The retention shelves 82 assist in retaining the damper seal 98 in the neck cavity 90. The damper seal 98 is free to move and slide to dampen vibrations and provide frictional damping, but is restrained by both the retention shelves 82 and the engagement of the retention nub 92 in the opening 120 of damper seal 98.

Figure 8:
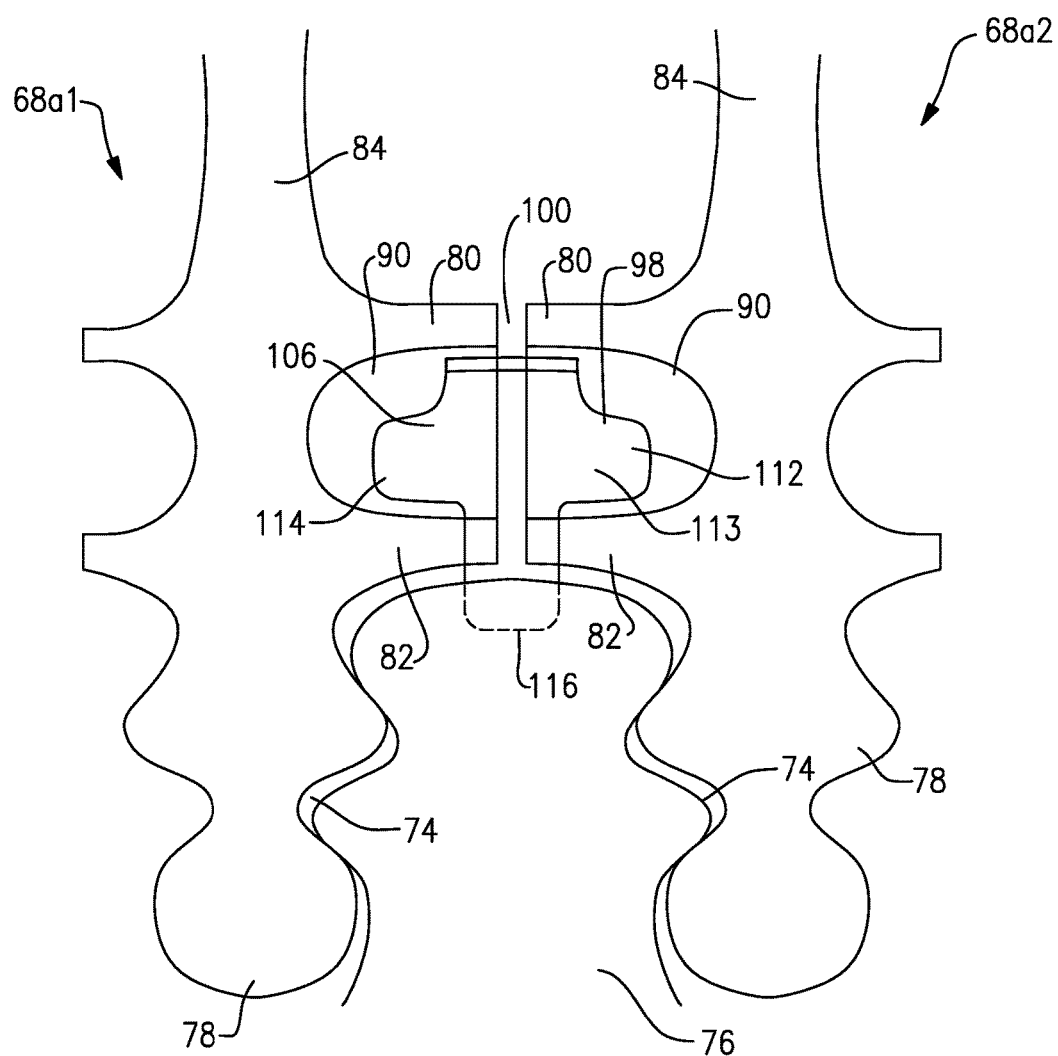
FIG. 8 illustrates a cross-sectional front view of the first example damper seal installed between two turbine blades installed in a turbine disk.
Figure 9:
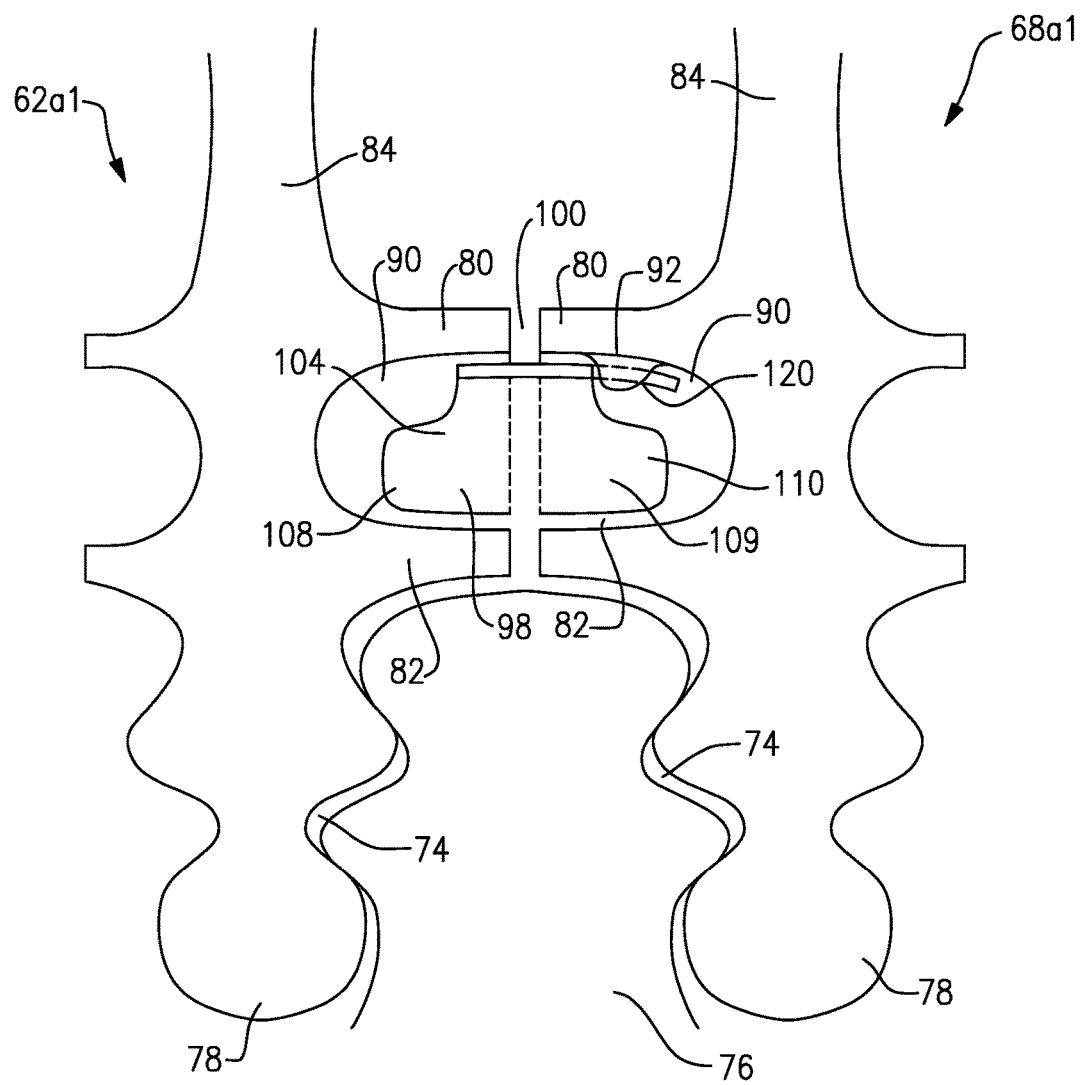
FIG. 9 illustrates a cross-sectional rear view of the first example damper seal installed between two turbine blades installed in a turbine disk.

FIGS. 7 to 9 illustrate the damper seal 98 installed between adjacent turbine blades 68a1 and 68a2. The damper seal 98 is located in the neck cavity 90 of the turbine blades 68a1 and 68a2. The damper seal 98 is located under the platforms 80 and above the retention shelves 82 of the adjacent blades 68a1 and 68a2 and spans the space 100 between the platforms 80 of the turbine blades 68a1 and 68a2. The retention nub 92 of the turbine blade 68a2 is received in the opening 120 of the damper seal 98. The third tab 116 on the second downwardly curved portion 106 of the damper seal 98 (shown in FIG. 8) blocks the space 100 between the adjacent turbine blades 68a1 and 68a2 and provides a seal to prevent the cooling air F from leaking from the neck cavities 90 and into the hot gas flow path E.

Figure 10:
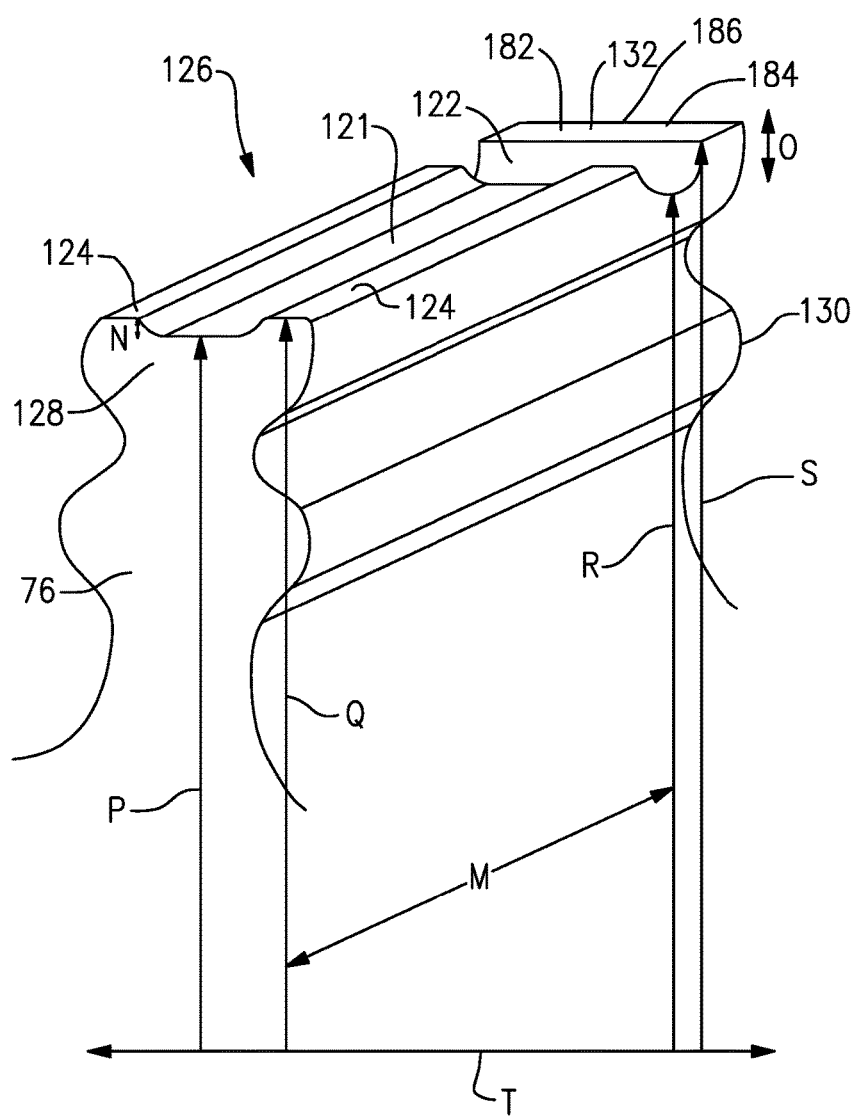
FIG. 10 illustrates an embodiment of a top perspective view of a disk lug of a turbine disk.
Figure 11:
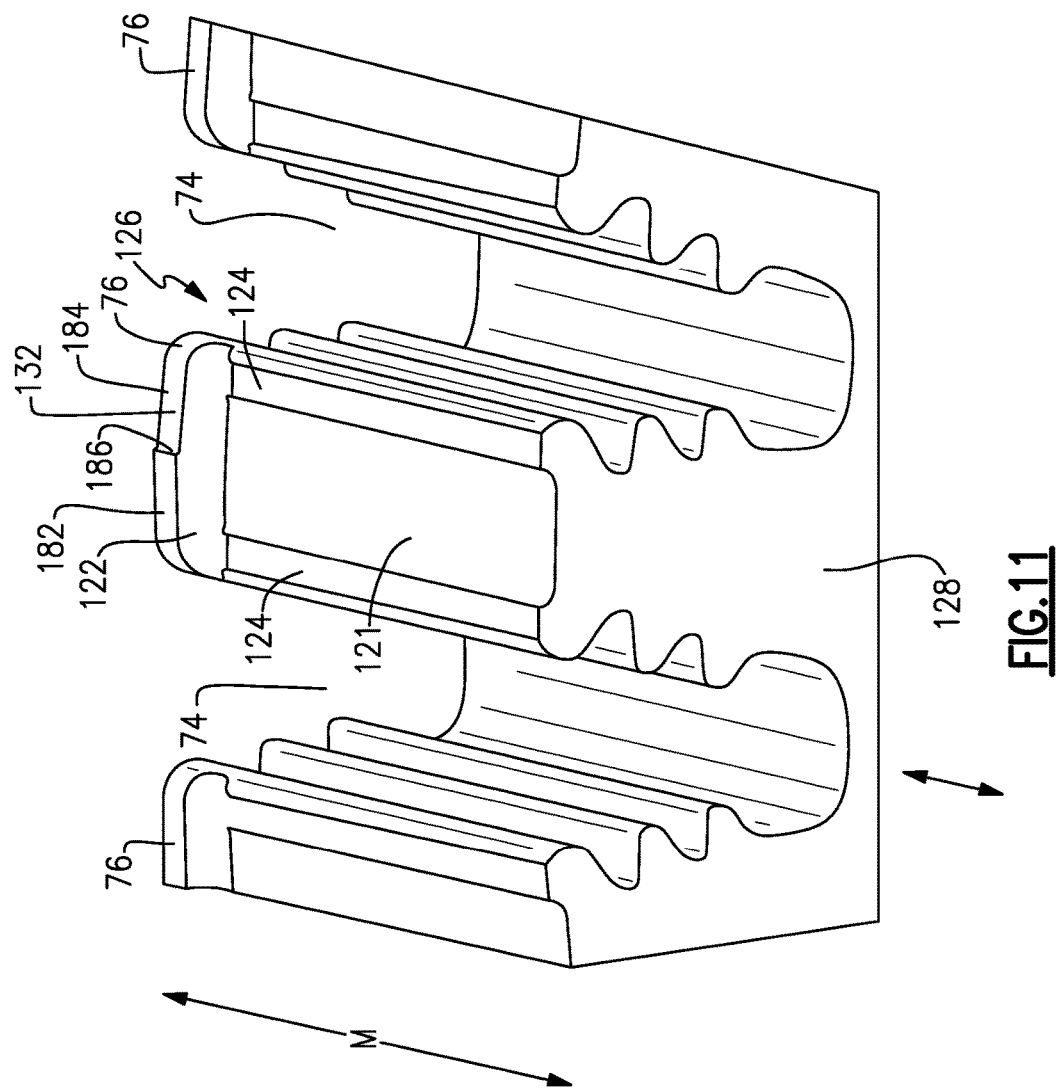
FIG. 11 illustrates another top perspective view of the turbine disk of FIG. 10.

FIGS. 10 and 11 illustrate perspective views of a turbine disk lug 76 located between adjacent turbine disk slots 74 of a turbine disk 61. A first trough 121 and a second trough 122 are formed on an upper surface 126 of the turbine disk lug 76. The first trough 121 has a depth N, and the second trough 122 has a depth O, and the depth N of the first trough 121 is less than a depth O of the second trough 122. The second trough 122 is deeper than the first trough 121 to assist in the formation of the first trough 121. The first trough 121 extends along an axis M of the turbine disk lug 76 (and is substantially parallel to the length L of the turbine blade 68a and the longitudinal axis A).

The first trough 121 is surrounded by two raised surfaces 124. The two raised surfaces 124 are formed by a turning process, and the first trough 121 is formed by a milling process. The second trough 122 is also formed by a turning process.

The first trough 121 extends axially and begins at a first side 128 of the turbine disk lug 76 and terminates in a region near an opposing second side 130 of the turbine disc lug 76.

The raised surfaces 124 on opposing sides of the first trough 121 provide balance mass on the upper surface 126 of the turbine disk lug 76 (in one example, approximately 531 lbf per turbine disk lug 76) and provide clearance for the damper seal 98. The raised surfaces 124 compensate for any offset of the center of gravity that might occur if the turbine disk 61 is not perfectly round when machined. The first trough 121 also allows for clearance for assembly of the damper seal 98.

The second trough 122 extends circumferentially on the upper surface 126 of the turbine disk lug 76 and is located substantially perpendicularly to the first trough 121 and near the opposing second side 130 of the turbine disc lug 76, defining a leak discouraging tab 132 between the second trough 122 and the opposing second side 130 of the turbine disk lug 76.

The upper surface of the leak discouraging tab 132 includes a first portion 182 and a second portion 184. The first portion 182 inclines upwardly towards a center of the turbine disk lug 76 greater than the second portion 184 inclines, and a ledge 186 is defined at a location where the first portion 182 and the second portion 184 meet.

A bottom surface of the first trough 121 is located a distance P from a central axis T of the turbine disk 61, and the distance P is generally equal to the distance from the center to an outer surface of a turbine disk lug of a conventional turbine rotor. The upper surfaces of the two raised surfaces 124 are located a distance Q from the central axis T of the turbine disk 61. A bottom surface of the second trough 122 is located a distance R from the central axis T of the turbine disk 61. A lowermost portion of the upper surface of the leak discouraging tab 132 is located a distance S from central axis T of the turbine disk 61.

The distance R to the bottom surface of the second trough 122 is less than the distance P to the bottom surface of the first trough 121, and the distance P to the bottom of the first trough 121 is less than the distance Q to the two raised surfaces 124. The distance Q to the upper surfaces of the two raised surfaces 124 is less than the distance S to the lowermost portion of the upper surface of the leak discouraging tab 132. The distance Q to the upper surfaces of the two raised surfaces 124 is less than the distance S to the leak discouraging tab 132, reducing the amount of material of which the turbine disk 61 is formed and also stresses.

Figure 12:
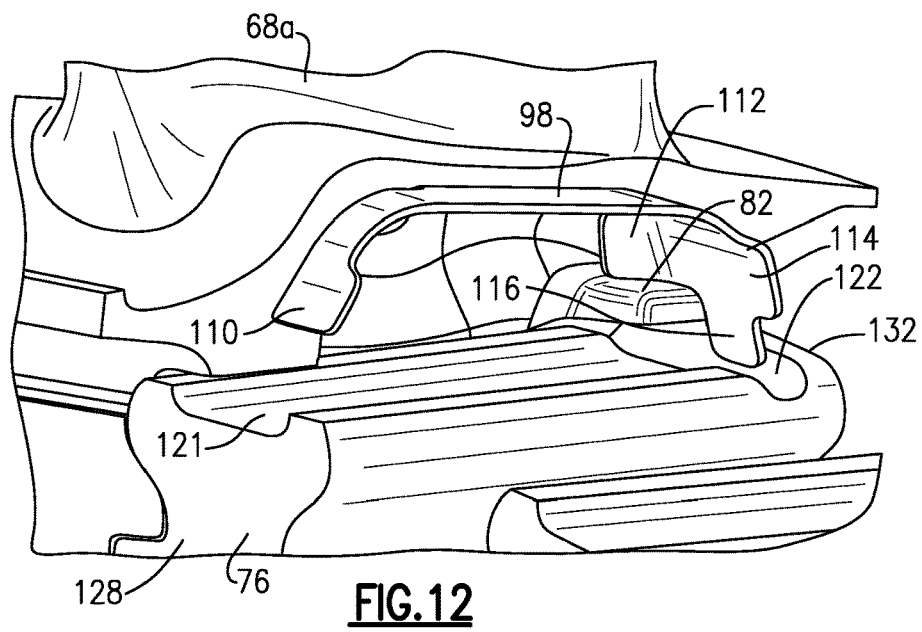
FIG. 12 illustrates a perspective view of the damper seal of FIG. 5 and one turbine blade installed in the a turbine disk slot of the turbine disk of FIG. 10.
Figure 13:
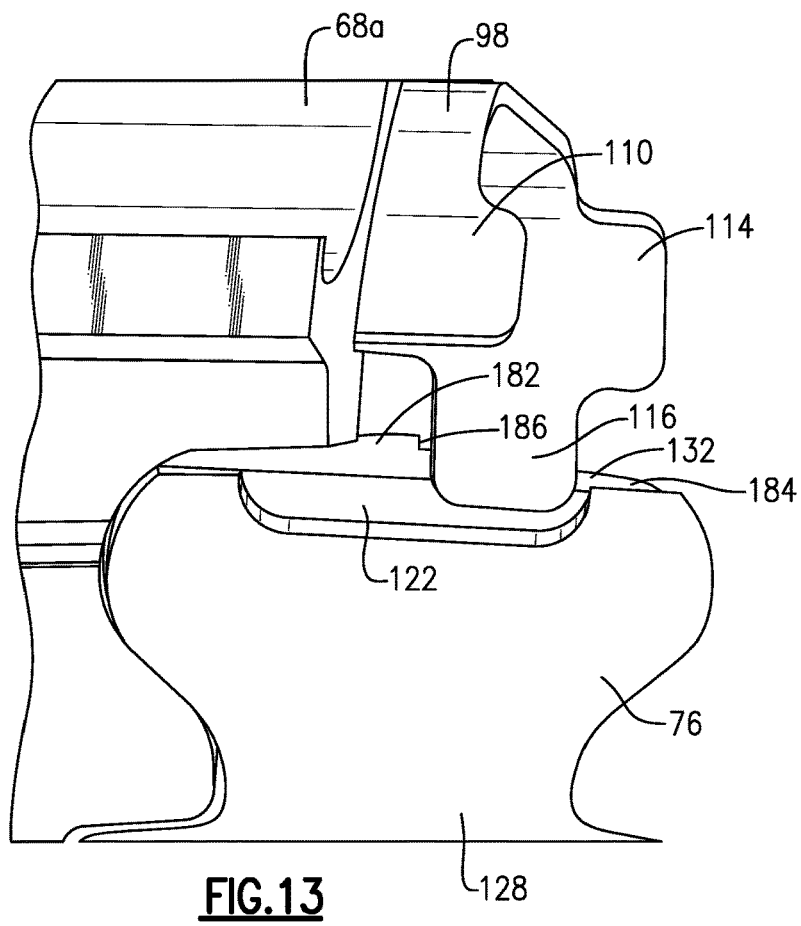
FIG. 13 illustrates a front view of the damper seal of FIG. 5 and one turbine blade installed in the turbine disk slot of the turbine disk of FIG. 10.

FIGS. 12 and 13 illustrate the damper seal 98 installed in a turbine blade 68a received in the turbine disk slot 74. When the turbine blade 68a is installed in the turbine disk 61, the turbine blade 68a is installed from the first side 128 and slid along the axis M. The third tab 116 of the damper seal 98 slides through the first trough 121 of the turbine disk lug 76. The first trough 121 allows the turbine blade 68a to slide into the turbine disk slot 74 in the direction V without interference with the damper seal 98.

The leak discouraging tab 132 acts as a seal to prevent the cooling air F from escaping from the neck cavity 90. The second trough 122 provides clearance for the third tab 116. When the damper seal 98 is installed in the neck cavity 90 of the turbine blade 68a that is installed in a turbine disk slot 74, the third tab 116 of the second downwardly curved portion 106 of the damper seal 98 rests flush on a rear surface 188 of the leak discouraging tab 132 to assist in preventing the leakage of the cooling air F from the neck cavity 90 and into the hot gas flow path E.

In one example, the turbine disk slots 72 are angled approximately 10° relative to a centerline of the turbine disk 61. When a traditional turbine blade is installed in a turbine disk slot, a gap exists between a lower surface of the platform and an upper surface of the turbine disk. In one example, an angle between a blade root and the platform of the turbine disk is 16°. The angle may vary greatly depending on the embodiment.

Figure 14:
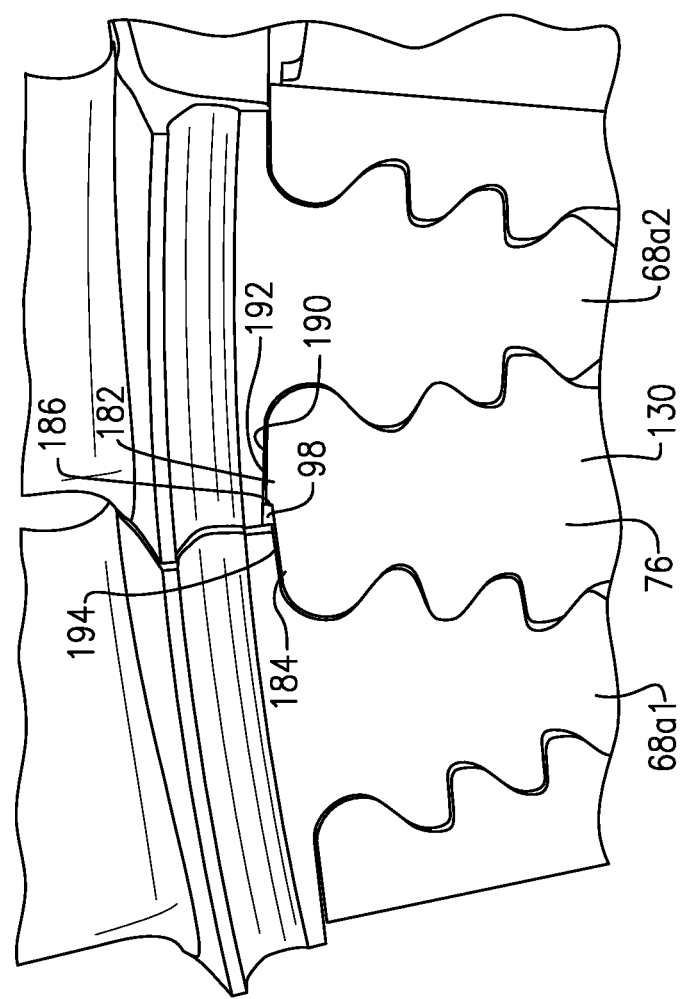
FIG. 14 illustrates a front view of two turbine blades each installed in one of the turbine disk slots of the turbine disk of FIG. 10.

As shown in FIG. 14, an upper surface 192 of the first portion 182 of the leak discouraging tab 132 has a contour that corresponds to a contour of a lower surface 190 of the platform 80. That is, the upper surface 192 of the first portion 182 of the leak discouraging tab 132 is substantially parallel to the lower surface 190 of the platform 80. The upper surface 192 of the first portion 182 has a greater incline than an upper surface 194 of the second portion 184, and the ledge 186 is defined between the portions 182 and 184. The proximity of the upper surface 192 of the first section 182 and the lower surface 190 of the platform 80 create a seal that prevents the cooling air F from leaking.

Additionally, the damper seal 98 also blocks the passage of the cooling air F through any gap that might exist, for example, a gap between the lower surface 190 of the platform 80 and an upper surface 194 of a portion of the second portion 184 of the leak discouraging tab 132 that is located under the platform 80.

In one example, the damper seal 98 is installed in the turbine blades 68*a* prior to the installation of the turbine blades 68*a* into the turbine disk 61. This prevents the damper seal 98 from falling out when the turbine blades 68*a* are partially installed into the turbine disk 61. Alternately, the damper seal 98 can be installed after the turbine blades 68*a* are engaged in the turbine disk 61, but not fully installed in the turbine disk 61.

By employing a damper seal 98 that combines the features of a damper and a seal in a single component, the number of parts and the weight is reduced. Additionally, the assembly process is simplified by requiring only one component to be installed between adjacent turbine blades 68*a*.

Figure 17:
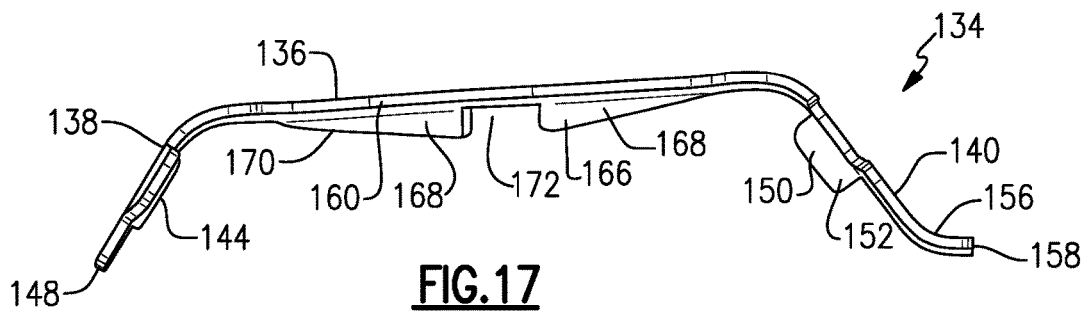
FIG. 17 illustrates a side view of the second example damper seal.
Figure 16:
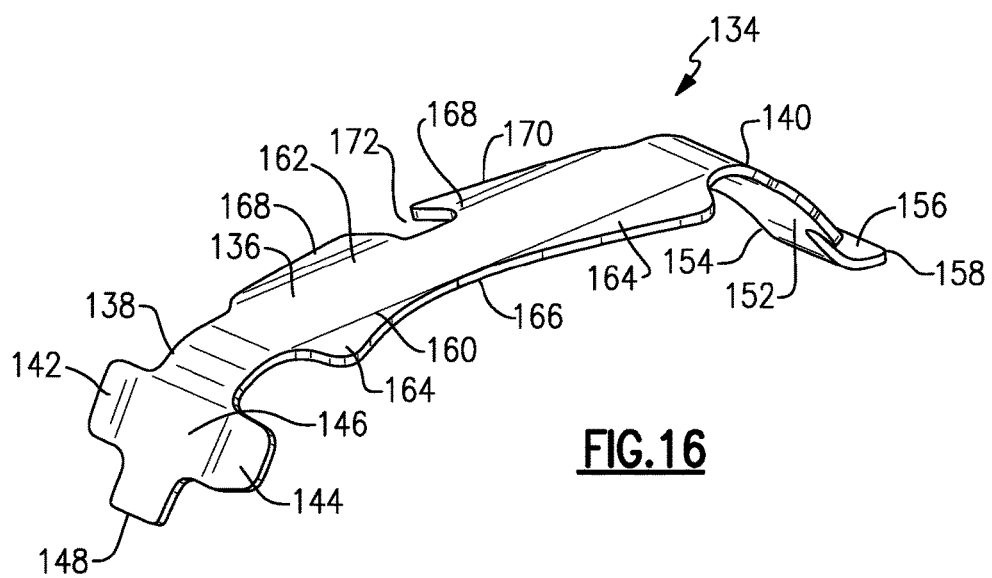
FIG. 16 illustrates a perspective view of the second example damper seal.
Figure 15:
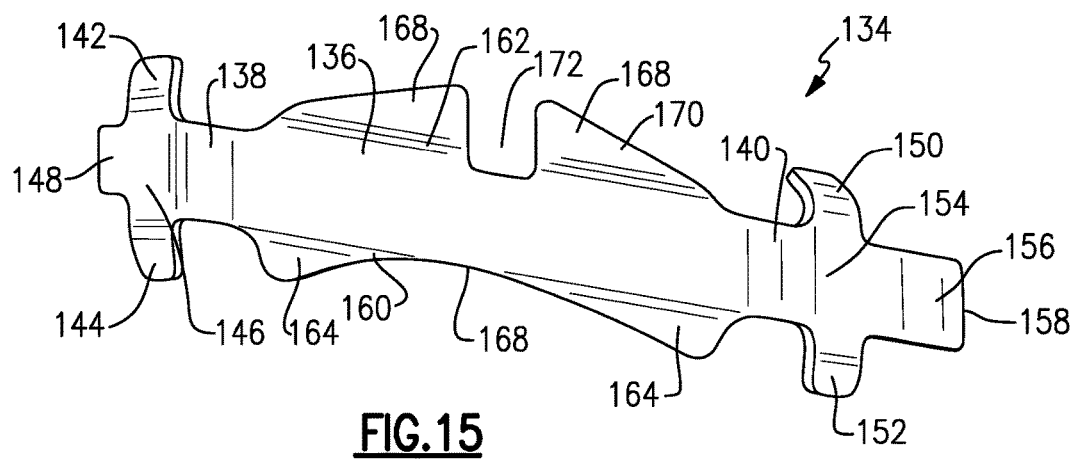
FIG. 15 illustrates an embodiment of a top view of a second example damper seal.
Figure 18:
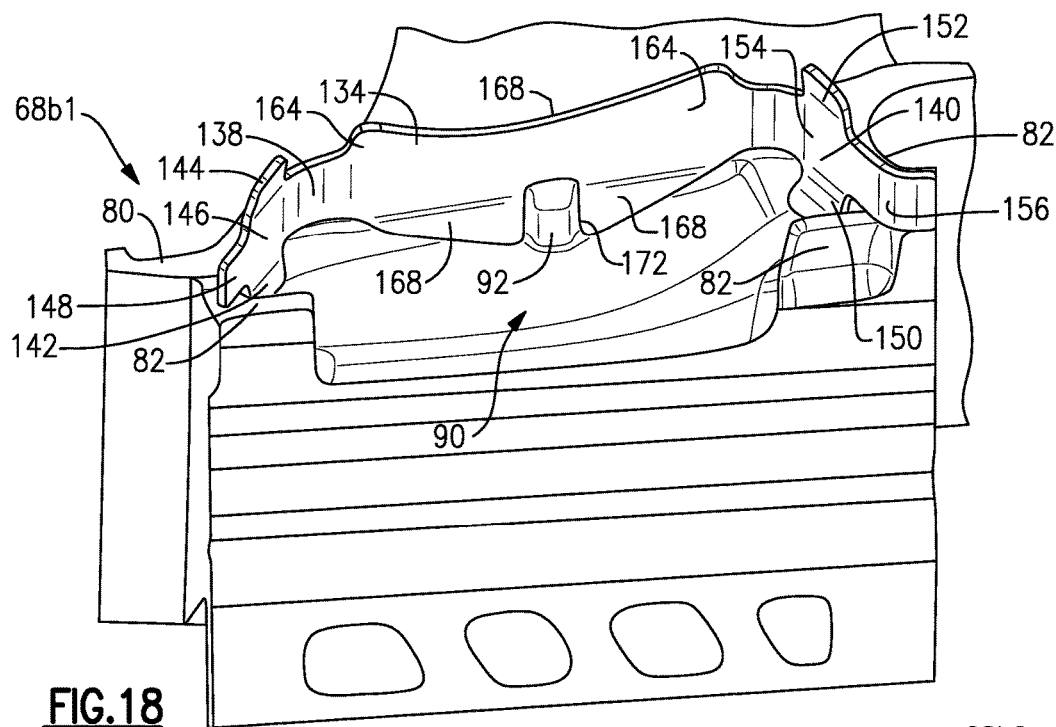
FIG. 18 illustrates a side view of the second example damper seal installed in a turbine blade.

FIGS. 16, 17 and 18 illustrate another example a damper seal 134 employed with a turbine blade 68*b* employed in the second stage 72 of the high pressure turbine 54. The damper seal 134 spans the space 100 between platforms 80 of adjacent turbine blades 68*b* to provide sealing and prevent the leakage of cooling air F. The turbine blades 68*b* of the second stage 72 have a length that is greater than a length of the turbine blades 68*a* of the first stage 70 as the turbine blades 68*b* of the second stage 72 extract a different amount of work.

The damper seal 134 imposes a normal load on the turbine blades 68*b*. The resulting frictional force created by the normal load produces damping, reducing a vibratory response. The damper seal 134 prevents the cooling air F from leaking from the neck cavity 90 of the turbine blades 68*b* and into the hot gas flow path E along arrows G (shown in FIG. 3).

The damper seal 134 is stamped from sheet metal. The damper seal 134 can also be formed by direct metal laser sintering. Other manufacturing methods are possible. The damper seal 134 is ductile enough to conform to the lower surface 91 of the platform 80 of the turbine blade 68*b* and provide consistent and complete contact with the turbine blade 68*b*. The damper seal 134 includes an upper portion 136 that is substantially flat. The damper seal 134 also includes a first projection 138 and a second projection 140 that extend at an angle relative to the upper portion 136 and from opposing end regions of the upper portion 136. In one example, the second projection 140 is longer than the first projection 138.

The first projection 138 includes a first tab 142 and a second tab 144 that extend in opposing directions and substantially perpendicularly to the first projection 138 to define an enlarged portion 146. The enlarged portion 146 provides additional width to the damper seal 134 and prevents rocking of the damper seal 134. A third tab 148 extends substantially perpendicularly to the first tab 142 and the second tab 144 and extends in the general direction of the first projection 138. The third tab 148 is narrower than the enlarged portion 146. The third tab 148 provides sealing and prevents the cooling air F in the neck cavity 90 from leaking and entering the hot gas flow path E when the damper seal 134 is installed in the turbine blade 68*b*.

The second projection 140 includes a first tab 150 and a second tab 152 that extend in opposing directions and substantially perpendicularly to the second projection 140 to define an enlarged portion 154. The enlarged portion 154 provides additional width and prevents rocking of the damper seal 134. A third tab 156 extends substantially perpendicularly to the first tab 150 and the second tab 152 and extends in the general direction of the second projection 140. The third tab 156 is narrower than the enlarged portion 154. The third tab 156 provides sealing and when the damper seal 134 is installed in the turbine blade 68*b*, and the third tab 156 prevents the cooling air F in the neck cavity 90 from leaking and entering the hot gas flow path E. The third tab 156 also includes a curved end portion 158.

The upper portion 136 of the damper seal 134 includes a first side 160 and an opposing second side 162. Two spaced apart substantially triangular shaped portions 164 extend from the first side 160. Together, the two spaced apart substantially triangular shaped portions 164 define a curved outer surface 166. The two spaced apart substantially triangular shaped portions 164 are co-planar with the upper portion 136.

Two spaced apart substantially triangular shaped portions 168 extend from the opposing second side 162 of the upper portion 136 and extend at a downward angle relative to the upper portion 136. The two spaced apart substantially triangular shaped portions 168 together define a curved outer surface 170. A rectangular opening 172 is defined between the two spaced apart substantially triangular shaped portions 168. The rectangular opening 172 receives the retention nub 92 of the turbine blade 68*b* when the damper seal 134 is installed in the turbine blade 68*b*, preventing misalignment between the damper seal 134 and the turbine blade 68*b*.

FIG. 18 illustrates a perspective view of the damper seal 134 installed in a neck cavity 90 between two adjacent turbine blades 68*b*1 and 68*b*2. The turbine blades 68*b*1 and 68*b*2 each include a retention shelf 82 on opposing sides of the platform 80 and a retention nub 92. The retention shelves 82 extend inwardly. The upper portion 136 of the damper seal 134 is located under the platform 80 and adjacent to the lower surface 91 of the platform 80. The retention nub 92 of the turbine blades 68*b* is received in the opening 172 of the damper seal 134. The spaced apart substantially triangular portions 168 on the second side 162 of the upper portion 136 of the damper seal 134 are positioned against the turbine blade 68*b*. The enlarged portion 146 of the first projection 138 rests on one retention shelf 82, and the enlarged projection 154 of the second projection 140 rests on another retention shelf 82. The third tab 156 of the second projection 140 curves under the buttress 93. When installed, the contour of the first projection 138 and the second projection 140 corresponds to the contour of the lower surface 91 of the platform 80.

Figure 19:
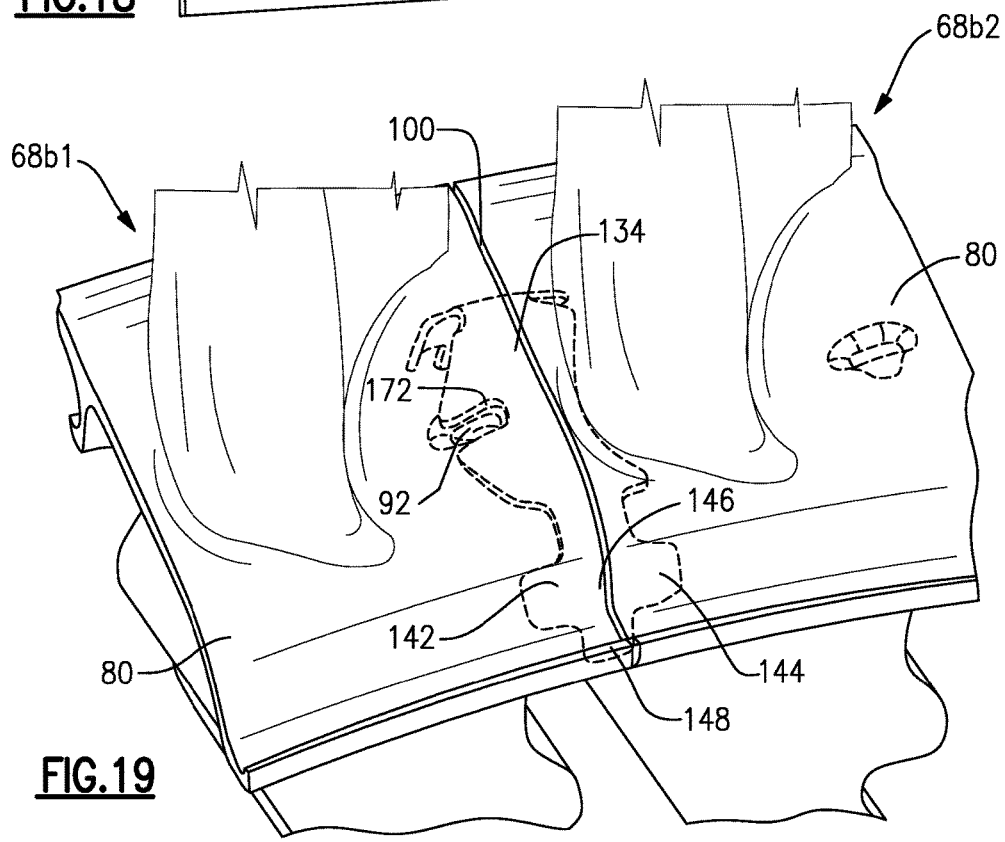
FIG. 19 illustrates a perspective view of the second example damper seal installed between two adjacent turbine blades.

FIG. 19 illustrates a top perspective view of the damper seal 134 installed in adjacent turbine blades 68*b*1 and 68*b*2. The damper seal 134 is located in the neck cavity 90 of the turbine blades 68*b*1 and 68*b*2. The damper seal 134 is located under the platforms 80 and above the retention shelves 82 of the adjacent turbine blades 68*b*1 and 68*b*2 and spans the space 100 between the platforms 40. The retention nub 92 of the platform 80 of the turbine blade 68*b*1 is received in the opening 172 of the damper seal 68*b*1.

As explained above with respect to the third tab 116 of the damper seal 98 employed in the first stage 70 of the high pressure turbine 54, the third tabs 148 and 156 of the projections 138 and 140, respectively, of the damper seal 134 prevent the cooling air F from escaping the neck cavity 90 and entering the hot gas flow path E. In the second stage 72 of the high pressure turbine 54, both end regions of the damper seal 134 provide sealing with respect to the flow path of the hot gas E. Therefore, sealing is provided on opposing ends of the turbine blade 68*b*.

Figure 20:
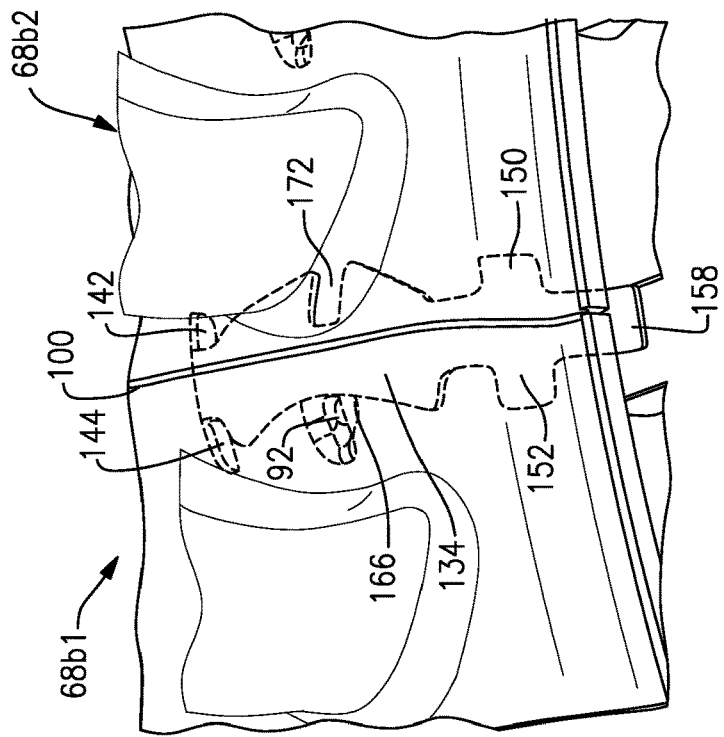
FIG. 20 illustrates a top view of the second example damper seal installed improperly between two adjacent turbine blades in phantom lines.

The damper seal 134 also includes mistake proof features that prevent improper installation of the damper seal 134 with respect to the turbine blades 68*b*1 and 68*b*2. FIG. 20 illustrates in phantom lines a damper seal 134 that has been improperly installed in the turbine blades 68*b*1 and 68*b*2. When the damper seal 134 is properly installed, the retention nub 92 is received in the opening 172 of the damper seal 134. If the damper seal 134 was installed improperly, the space between the retention nub 92 of one turbine blade 68*b*1 and the structure of an adjacent turbine blade 68*b*2 is too small to allow installation of the damper seal 134. FIG. 20 shows an improperly installed damper seal 134 and the overlapping of the damper seal 134 with features of the turbine blades 68*b*1 and 68*b*2 in phantom lines.

Figure 21:
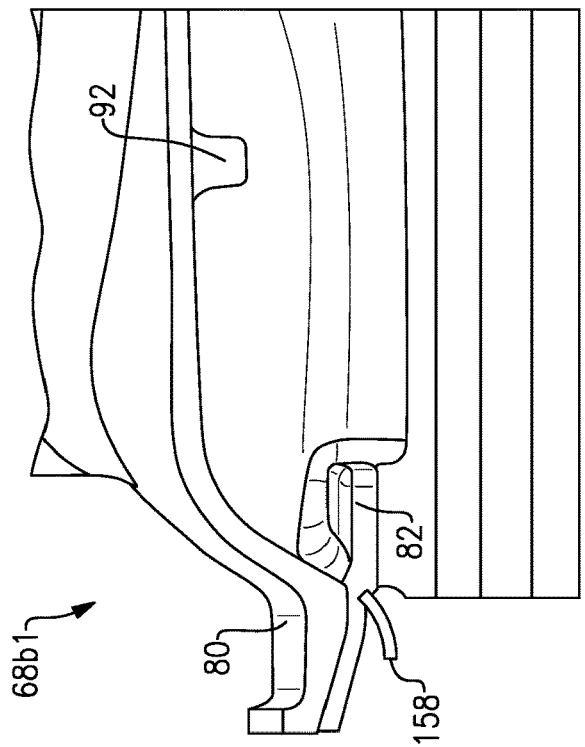
FIG. 21 illustrates a side view of the second example damper seal installed improperly in a turbine blade.

Additionally, as shown in FIG. 21, a visual indication is provided if the damper seal 134 is improperly installed as the curved end portion 158 of the third tab 156 would be visible.

The retention shelves 82 assist in retaining the damper seal 134 in the neck cavity 90. The damper seal 134 is free to slide in a direction substantially perpendicular to the length of the platform 80 to dampen vibrations and provide frictional damping, but the engagement of the retention nub 92 in the opening 172 of the damper seal 134 and the restraint provided by the retention shelves 82 prevent movement of the damper seal 134 in a direction substantially parallel to the length of the platform 80.

The damper seal 134 is installed in the neck cavities 90 of the turbine blades 68*b* prior to installation of the turbine blades 68*b* into the turbine disk 61. This prevents the damper seal 134 from falling out when the turbine blades 68*b* are partially installed into the turbine disk 61. Alternately, the damper seal 134 can be installed after the turbine blades 68*b* are engaged in the turbine disk 61, but not fully installed in the turbine disk 61.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

What is claimed is:

1. A damper seal received in a cavity of a turbine blade located between a platform and a retention shelf, the damper seal comprising:
    a central body portion having a first end region, an opposing second end region, and a width;
    a first portion extending from the first end region of the central body portion, wherein the first portion includes first outwardly extending tabs that define a first enlarged portion that has a first width greater than the width of the central body portion, wherein the first portion includes a first another tab that extends substantially perpendicularly to the first outwardly extending tabs, and the first another tab extends away from the central body portion such that the first outwardly extending tabs are located between the central body portion and the first another tab; and
    a second portion extending from the opposing second end region of the central body portion.

2. The damper seal as recited in claim 1 wherein the second portion includes second outwardly extending tabs that define a second enlarged portion that has a second width greater than the width of the central body portion.

3. The damper seal as recited in claim 1 wherein the damper seal is formed from stamped sheet metal.

4. The damper seal as recited in claim 2 wherein the second portion includes a second another tab that extends substantially perpendicularly to the second outwardly extending tabs, and the second another tab extends away from the central body portion such that the second outwardly extending tabs are located between the central body portion and the second another tab.

5. The damper seal as recited in claim 1 wherein a portion of the damper seal engages a groove in a turbine disk lug of a turbine disk.

6. The damper seal as recited in claim 1 wherein the central body includes a projection that defines an opening, and the opening receives a lug of a turbine blade to align the damper seal relative to the turbine blade.

7. The turbine blade as recited in claim 1 wherein the first portion has a first height and the second portion has a second height, and the second height is greater than the first height.

8. The turbine blade as recited in claim 1 wherein the central body portion is curved.

9. The turbine blade as recited in claim 1 wherein the damper seal is substantially c-shaped.

10. A turbine blade comprising:
    a root received in a slot of a turbine disk;
    a blade;
    a platform located between the root and the blade, wherein the platform includes a retention shelf, and a cavity is defined between a lower surface of the platform and the retention shelf; and
    a damper seal received in the cavity of the turbine blade, the damper seal including a central body portion having a first end region, an opposing second end region, a width, a first portion extending generally downward from the first end region of the central body portion, and a second portion extending generally downward from the opposing second end region of the central body portion, wherein the first portion includes first outwardly extending tabs that define a first enlarged portion that has a first width greater than the width of the central body portion, wherein the first portion includes a first another tab that extends substantially perpendicularly to the first outwardly extending tabs, and the first another tab extends away from the central body portion such that the first outwardly extending tabs are located between the central body portion and the first another tab.

11. The turbine blade as recited in claim 10 wherein the second portion includes second outwardly extending tabs that define a second enlarged portion that has a second width greater than the width of the central body portion.

12. The turbine blade as recited in claim 10 wherein the damper seal is formed from stamped sheet metal.

13. The turbine blade as recited in claim 10 wherein the first enlarged portion rests on the retention shelf of the turbine blade.

14. The turbine blade as recited in claim 11 wherein the second portion includes a second another tab that extends substantially perpendicularly to the second outwardly extending tabs, and the second another tab extends away from the central body portion such that the second outwardly extending tabs are located between the central body portion and the second another tab.

15. The turbine blade as recited in claim 10 wherein a portion of the damper seal engages a groove in a turbine disk lug of the turbine disk.

16. The turbine blade as recited in claim 10 wherein the central body includes a projection that defines an opening, and the opening receives a lug on the lower surface of the platform of the turbine blade to align the damper seal relative to the turbine blade.

17. The damper seal as recited in claim 10 wherein the first portion has a first height and the second portion has a second height, and the second height is greater than the first height.

18. The damper seal as recited in claim 10 wherein the central body portion is curved.

19. The damper seal as recited in claim 10 wherein the damper seal is substantially c-shaped.

\* \* \* \* \*